Patented June 25, 1957

2,797,147

DISPOSAL OF SODIUM RESIDUES

Norval D. Clare, Niagara Falls, N. Y., assignor to E. I. du Pont de Nemours and Company, Wilmington, Del., a corporation of Delaware No Drawing. Application September 29, 1955, Serial No. 537,557

2 Claims. (Cl. 23—184)

This invention pertains to the disposal of residues of metallic sodium.

Sodium, one of the most active of the metals, is widely used industrially because of its unique properties. Its chemical reactivity, for example, finds an outlet in the manufacture of tetraethyl lead. Its low melting point and excellent heat conductivity, on the other hand, render it valuable as a fluid in certain types of heat-exchangers. Despite the great differences in the processes employing the metal, they have in common the problems of handling it. One of these problems is the disposal of sodium wastes.

Several methods have been utilized heretofore to destroy sodium residues. All, however, suffer from various disadvantages. One method of destruction, for example, burns the sodium in air. Although effective when special sodium burners are available, this method is inapplicable to sodium held within complex apparatus because the interior thereof cannot be reached. The oxidation of the sodium may also generate excessive temperatures. The nature of the equipment used in some reactions sets a maximum allowable temperature of 600° F. (about 316° C.).

Another method of destroying sodium is to react the metal with steam or water. This reaction is always difficult to control and may produce local temperatures above those tolerable in the equipment. It is, additionally, incapable of use below 600° F. Since the melting point of sodium hydroxide is about 318° C., the compound is a solid at 600° F. Consequently, when the temperature is kept relatively low a crust of solid sodium hydroxide may form over unreacted sodium. The steam or water utilized eventually dissolves away patches of the crust and contacts the metal underneath. The high temperatures evolved and the hydrogen gas trapped under the crust then result in violent explosions.

A third method of destroying sodium wastes that has been suggested is reacting them with certain organic chemicals. These reagents are, however, too expensive for general use.

An object of the present invention is, consequently, provision of a novel and useful method for destroying waste sodium.

Another object is provision of a method for destroying sodium without generating temperatures above about 600° F. (316° C.).

A further object is provision of a cheap method for destroying sodium in situ or trapped in locations not readily accessible.

The above-mentioned and yet other objects are achieved in accordance with this invention by a process consisting of the following sequence of steps: (1) the sodium is reacted in situ with gaseous ammonia and converted to sodamide, a liquid at temperatures not harmful to equipment; (2) the sodamide is converted to sodium hydroxide by contact with steam; (3) the sodium hydroxide is dissolved in water; and (4) the resultant solution is flowed from the reactor.

Pure ammonia can be used alone in the process if it is so desired. The reaction between pure ammonia gas and sodium is, however, so slow at acceptable temperatures as to be somewhat impracticable. It has been found that a small amount of water vapor exerts a catalytic effect on the reaction. Therefore, at least about 2.7% by volume of water vapor should be added to the ammonia. This quantity of steam multiplies the reaction rate by a factor of about 3. Still higher reaction rates can be obtained by increasing the quantity of steam in the ammonia. When the volume of steam rises above about 10% the rate becomes too violent for use with pure sodium as is the case with steam alone.

In a preferred embodiment of the invention, therefore, ammonia containing about 2–10% of water vapor is passed over the sodium until substantially all of the latter is converted to sodamide or sodium hydroxide. To prevent excessive reaction rates, the reaction should be initiated with ammonia containing a quantity of water vapor near the lower limit, i. e., 2–3%. As the conversion of the sodium proceeds, the percentage of water can be gradually raised to about 10%. Care should be taken that the temperature within the reactor is not raised above 600° F. When the sodium is substantially destroyed, pure steam or water vapor is passed over the product to convert all of it to sodium hydroxide. This material is hygroscopic and will eventually absorb enough water from the steam to dissolve itself. Since the absorption is relatively slow, a stream of water is preferably used when the conversion of the sodamide is complete. In any event, the apparatus within which the reaction products are held should finally be rinsed with water.

There are no sharply critical process variables except the concentration of water vapor in ammonia. For best results, this should be between about 2 and 10% until the sodium has been substantially destroyed. The temperature generated is thus kept below 316° C. Some acceleration of the ammonia-sodium reaction occurs when the percentage of water vapor is below 2.7%. Consequently, the amount utilized may be referred to broadly as "catalytic amount." No conclusions as to the mechanism of the reaction should be drawn from this terminology.

The percentage of water vapor in the ammonia can be controlled in any desired manner. One method found effective, however, is to pass dry ammonia gas through an aqueous solution of ammonium hydroxide. Raising the temperature will increase the quantity of water vapor picked up by the gas. Direct mixture of steam with the ammonia is also possible.

The temperature of the ammonia-water vapor mixtures is not too important. The room temperatures obtained on passing dry ammonia through aqueous hydroxide solutions is effective. The slightly elevated temperatures obtained when the temperature of the solution is raised to increase the concentration of water vapor are also satisfactory.

The pressure of the incoming gas is, like its temperature, not critical. Ambient or atmospheric pressure is preferred since it is most easily obtained. Super- or subatmospheric pressures may, however, be used as desired.

One precaution in carrying out the process should be observed. Air must be strictly excluded from the reactor until all the sodamide has been converted to the hydroxide since oxygen reacts with this compound to form dangerously explosive products. The direct removal of molten sodamide from the reactor in which it is formed, although theoretically possible, is, therefore, much less preferred than conversion of the same to sodium hydroxide and dissolution of the latter in water.

In one example illustrating the practice of the invention sodium was melted in an iron pot immersed in a salt bath held at 312–320° C. A stream of gas at ambient pressure and at a rate of 1 liter per minute, measured at 0° C. and 760 mm. of mercury pressure, was blown over the surface of the sodium from a tube exit ¾″ distant therefrom. In a control run at 316° C., pure ammonia gas destroyed sodium quietly at a rate of 0.8 g./sq. in./hr. with no tendency to develop local hot spots. In a test run, 2.7% by volume of steam was added to the ammonia by passing the dry ammonia gas through a solution of ammonium hydroxide held at 35° C. Destruction of sodium at 316° C. was accomplished quietly at the rate of 2.3 g./sq. in./hr., almost three times the rate obtained with ammonia gas alone.

In another example illustrating the practice of the invention, liquid sodium held within a heat-exchanger is substantially completely drained therefrom. Ammonia at ambient pressure and containing about 2.7% by volume of water vapor is passed therethrough until residual sodium is destroyed. Steam is then passed over the resultant sodamide. When all of the sodamide is converted to sodium hydroxide, the heat-exchanger is flushed out with water.

Having described my invention, I claim:

1. The method of disposing of sodium residues, held in a substantially fixed location, at temperatures not above about 600° F. which comprises (1) contacting the residues in said location with gaseous ammonia to convert the same to sodamide, (2) contacting the sodamide with water vapor to convert the sodamide to sodium hydroxide, (3) dissolving the sodium hydroxide in water and (4) flowing the resultant solution from said substantially fixed location.

2. The invention of claim 1 in which the gaseous ammonia contains between about 2 and 10% by volume of water vapor.

References Cited in the file of this patent

UNITED STATES PATENTS

| | | |
|---|---|---|
| 1,163,498 | Ashcroft | Dec. 7, 1915 |
| 1,359,080 | Liebknecht | Nov. 16, 1920 |
| 2,527,443 | Padgitt | Oct. 24, 1950 |

OTHER REFERENCES

J. W. Mellor's "A Comprehensive Treatise on Inorganic and Theoretical Chemistry," vol. 8, 1928 ed., pp. 255, 256; Longmans, Green and Co., N. Y.